United States Patent
Molinari et al.

(10) Patent No.: US 9,700,880 B2
(45) Date of Patent: Jul. 11, 2017

(54) CATALYTIC SYSTEM AND PROCESS FOR THE TOTAL HYDROCONVERSION OF HEAVY OILS

(75) Inventors: Daniele Molinari, Lodi (IT); Giuseppe Bellussi, Piacenza (IT); Alberto Landoni, Rho (IT); Paolo Pollesel, San Donato Mil.se (IT)

(73) Assignee: ENI S.P.A. (IT)

( * ) Notice: Subject to any disclaimer, the term of this patent is extended or adjusted under 35 U.S.C. 154(b) by 323 days.

(21) Appl. No.: 14/343,007

(22) PCT Filed: Sep. 6, 2012

(86) PCT No.: PCT/EP2012/067412
§ 371 (c)(1),
(2), (4) Date: Apr. 7, 2014

(87) PCT Pub. No.: WO2013/034642
PCT Pub. Date: Mar. 14, 2013

(65) Prior Publication Data
US 2014/0291203 A1 Oct. 2, 2014

(30) Foreign Application Priority Data
Sep. 8, 2011 (IT) .............................. MI2011A1626

(51) Int. Cl.
*C10G 47/02* (2006.01)
*C10G 47/16* (2006.01)
(Continued)

(52) U.S. Cl.
CPC ............. *B01J 29/89* (2013.01); *B01J 27/051* (2013.01); *B01J 29/7876* (2013.01);
(Continued)

(58) Field of Classification Search
CPC ................................ C10G 65/12; C10G 47/02
See application file for complete search history.

(56) References Cited

U.S. PATENT DOCUMENTS

| 5,871,635 A * | 2/1999 | Gupta | C10G 45/00 208/108 |
| 2006/0011510 A1 | 1/2006 | Toshima et al. | |
| 2012/0234726 A1* | 9/2012 | Morel | C10G 49/04 208/49 |

FOREIGN PATENT DOCUMENTS

| EP | 0543529 A1 | 5/1993 |
| WO | 0208360 A1 | 1/2002 |

(Continued)

OTHER PUBLICATIONS

Yang, W-C. (2003). "Bubbling Fluidized Beds," in Handbook of Fluidizaton and Fluid-Particle Systems, Marcel Dekker, 53-112 [Office action particularly refers to Table 1 on p. 58].*

(Continued)

*Primary Examiner* — Brian McCaig
(74) *Attorney, Agent, or Firm* — Tarolli, Sundheim, Covell & Tummino LLP (57) ABSTRACT

A catalytic system characterized in that it comprises: a first catalyst, having a hydrogenating function, consisting of solid particles of which at least 95% by volume having an equivalent diameter smaller than 20 μm, containing one or more sulfides of metals of group VI and/or VIII B, possibly prepared starting from an oil-soluble precursor of the same; and a second catalyst, having a cracking function, consisting of solid particles of which at least 90% by volume having an equivalent diameter larger than 5 μm and smaller than 5 mm, containing an amorphous silico-aluminate and/or a crystalline silico-aluminate and/or an alumina, the equivalent average diameter of the solid particles of the second catalyst being greater than the equivalent average diameter of the solid particles of the first catalyst. Said catalytic system can be used in a process for the hydroconversion of heavy oils which comprises sending the heavy oil to a hydroprocessing step carried out in one or more slurry reactors, in the (Continued)

General block scheme of the process presence of hydrogen or a mixture of hydrogen and H$_2$S, obtaining a stream of products in vapor or liquid-vapor phase, and extracting at the bottom, in continuous or discontinuous, a liquid stream containing non-converted products together with the two catalysts of said catalytic system, said liquid stream extracted then being separated into a clarified primary stream containing the first catalyst, which is at least partially recycled to the hydroprocessing step, and a stream rich in the second catalyst, which is regenerated in a regeneration step and at least partially recycled to the hydroprocessing step.

17 Claims, 2 Drawing Sheets

(51) Int. Cl.
*C10G 65/12* (2006.01)
*B01J 29/89* (2006.01)
*B01J 27/051* (2006.01)
*B01J 29/78* (2006.01)
*C10G 45/12* (2006.01)
*C10G 65/00* (2006.01)

(52) U.S. Cl.
CPC ............ *C10G 45/12* (2013.01); *C10G 47/16* (2013.01); *C10G 65/12* (2013.01)

(56) References Cited

FOREIGN PATENT DOCUMENTS

| WO | 2008/151792 A1 | 12/2008 | |
|---|---|---|---|
| WO | 2009149923 A1 | 12/2009 | |
| WO | WO 2011/042617 A2 * | 4/2011 | ............ C10G 21/14 |

OTHER PUBLICATIONS

Stolzenberg, A.M. (2004). "Iron Compounds," in the Kirk-Othmer Encyclopedia of Chemical Technology, 33 pgs [Office action cites p. 16].*

* cited by examiner

Fig. 1: General block scheme of the process

Fig. 2: Example of process scheme

CATALYTIC SYSTEM AND PROCESS FOR THE TOTAL HYDROCONVERSION OF HEAVY OILS

The present patent application relates to a catalytic system and a process for the total hydroconversion of heavy oils.

More specifically, the objective of the process is the conversion to fuels of mixtures of hydrocarbons having a boiling point higher than 360° C., for example residues of atmospheric or vacuum distillation of petroleum or non-conventional oils (e.g. heavy oils, tar-sands) or heavy hydrocarbon fractions with a boiling point higher than 360° C., produced in conversion or separation processes of petroleum or non-conventional oils or fractions thereof (e.g. deasphalting, thermal cracking, fixed-bed or ebullated-bed hydroprocessing, etc.). The process can also be used for the conversion of compounds or mixtures of organic compounds produced by the liquefaction of coal or coming from oil shales, biomasses, polymers, industrial or urban waste products, possibly mixed with the hydrocarbon fractions having a boiling point higher than 360° C. described above.

Refineries use various processes for the conversion of heavy hydrocarbon fractions to fuels. The characteristics and applications are well-known to experts in the field of refinery.

The most widely-used are coking, visbreaking and conversion with ebullated-bed reactors. The atmospheric residue can be fed to the FCC plant, as a fraction of the feedstock, and mainly converted to light distillates and olefins. In recent years there has been an increasing interest for conversion processes of heavy hydrocarbon fractions with slurry reactors. Projects are currently underway for construction of slurry processes at industrial scale.

There are also applications which envisage the use of fixed-bed hydroprocessing plants. These have low conversion levels to fuels and mainly produce fuel oil with a low content of sulfur and metals. This product not only has a low commercial value but also a low absorption by the market and is consequently an undesired product.

Coking is a well-known process in the refinery field in which there is a thermal conversion of the hydrocarbon feedstock. The reaction conditions comprise heating the feedstock to temperatures higher than 500° C. The conversion takes place in various coke drums in parallel in which the coke formed accumulates. The coke produced represents a significant fraction of the feedstock fed. The distillates obtained are extremely aromatic and olefinic with relatively high sulfur and nitrogen contents. Before being used for the production of marketable fuels, they require a severe and costly hydrotreatment.

The less severe thermal processes, e.g. visbreaking and thermal cracking, produce little coke but considerable quantities of fuel oil. The yields to distillates are low and the quality of the distillates produced is poor and, as for coking, they require severe hydrotreatment.

FCC processes can treat distillation residues (e.g. atmospheric distillation residues) fed to the plant as a fraction of the total feedstock. The conversion is carried out with a solid acid catalyst at a relatively low pressure (close to atmospheric pressure). The main products are unsaturated and saturated hydrocarbon gases and light distillates. Minority LCO, coke (deposited on the catalyst and essentially transformed into $CO_2$ during the regeneration by combustion), a slurry oil containing heavy hydrocarbons, fine catalyst products and possibly heavy gas oil (HCO) are also produced. The main characteristics of the process are described, for example, in patent application WO2010/110944.

It is generally known that the products of FCC processes contain numerous aromatic and olefinic products together with relatively high quantities of sulfur and nitrogen with respect to the feedstock. The catalyst is recycled to the reactor after regeneration through the combustion of the organic compounds deposited by contact with a gas containing oxygen.

Processes with ebullated-bed reactors can be used for converting heavy hydrocarbon fractions, for example vacuum distillation residues. In these processes, the catalyst is confined inside the reactor. The catalytic particles are generally extruded and in any case have dimensions in the order of millimeters so as to create an ebullated bed in the reactor. The particles cannot have excessively small dimensions otherwise they would be carried with the liquid outside the reactor. The catalyst becomes deactivated with time. The heavier the starting feedstock, i.e. with a high fraction having a boiling point exceeding 540° C. and/or a high fraction of asphaltenes, the higher the deactivation. This is why the catalyst used is periodically substituted by fresh catalyst. The catalyst present in the reactor is an equilibrium catalyst with an activity lower than that of the fresh catalyst.

The conversion of the $540^+$ fraction in this process is generally limited to values ranging from 60 to 85%. The increase in the conversion causes a higher deactivation of the catalyst together with the possibility of fouling in the equipment downstream of the reactor (for example, exchangers, bottoms of the distillation columns, etc.). Therefore, in addition to the production of distillates, the ebullated-bed process produces a significant fraction of fuel oil.

Processes have been proposed for enhancing the performances of ebullated-bed plants, in which a slurry catalyst is added to the traditional ebullated-bed system. As indicated in U.S. Pat. No. 7,815,870 and in US 2008/0193345, the process performances are improved because the slurry catalyst allows a better conversion of the asphaltene fraction and reduces the tendency of the non-converted compounds, heavy residual hydrocarbons, to cause fouling of the ebullated catalyst, the reactor and the formation of sediments downstream of the latter. The improvements in the performances, however, are only incremental. With this process, in fact, it is not possible to obtain a high conversion of the fraction with a boiling point higher than 360° C. There is consequently a significant production of fuel oil and semi-manufactured VGO fractions which require further conversion in other refinery units.

Slurry processes have recently been a source of interest for many companies operating in the oil refinery and production industry. Some industrialization projects relating to these processes are underway.

These slurry processes comprise treatment of the feedstock at a high temperature (420-460° C.) and a high pressure (160-200 barg). The catalyst or catalytic system is extracted and recycled to the reactor, or extracted and removed as a product or by-product. All these processes lead to the production of light, medium and heavy distillates. Some of them also produce fuel oil, others envisage a purge to eliminate undesired by-products formed during the reaction, for example coke or similar compounds of a prevalently carbonaceous nature.

These slurry processes are capable of limiting the formation of coke or similar compounds, but have a relatively low conversion rate. Furthermore, the quality of the products obtained, especially if the feedstock conversion is total, requires further upgrading treatment with a relatively high severity.

The purge streams produced, with flow-rates within the range of 1-10% of the feedstock, must be managed and can represent an important critical aspect and a further significant cost.

An example of a slurry process for the conversion of heavy hydrocarbon fractions can be found in U.S. Pat. No. 4,591,426. The catalytic system used has a low cracking activity and a low hydrogenating activity. The catalytic system is derives from "iron laterite" or "limonite" or mixtures thereof, possibly treated to increase the activity. The process performances are poor in terms of conversion to fuels (bp 360⁻). In Example 8, in fact, the yield to products with a boiling point lower than 343° C. has proved to be less than 37% with respect to the heavy feedstock fed to the process. The quality of the products is low under both conditions indicated as "low severity" (tab. 15) and under those indicated as "high severity" (tab. 16). The liquid product has a sulfur content higher than or equal to 1.7 w %, it contains more than 3 w % of asphaltenes and more than 60 wppm of vanadium. The catalyst is recycled without regeneration downstream the reactor or it can be regenerated and subsequently recycled, only after separation by filtration downstream of the deasphalting. The catalyst is compelled to follow the course of the heavy hydrocarbon fraction and therefore to pass through all the units, most probably creating operational problems in the machineries and equipments (fouling by sedimentation, obstructions, erosion of organs in movement, etc.).

Another important technology which uses a nano-dispersed catalyst in a slurry reactor, is described in patent applications IT-M1200701044 and IT-M1200701044. This technology overcomes the main limitations described above, but the nano-dispersed catalyst (normally molybdenite) has a low cracking capacity and consequently in slurry processes, the cracking is mainly of a thermal nature (Applied Catalysis A: General, 204, 2000, page 215). This aspect involves large reaction volumes; in addition, for the same reason, the quality of the products obtained is such that, in order to reach the commercial specifications and allow the processability of the products according to conventional refinery schemes, subsequent hydrotreatment is requested at a high pressure and temperature, with a further increase in investment costs. Slurry hydrogenation catalysts and cracking catalysts in many ways have complementary characteristics, it was therefore considered interesting to start the development of a system capable of combining the values of a slurry hydrogenating catalytic system with those of a catalyst with a cracking function, in order to obtain synergies in the overall catalytic result for the application claimed.

Distillation residues represent the least valuable portion of oil. Their weight fraction is not normally negligible. In order to maximize the production of fuel, their conversion is necessary.

In this way, the yield to fuel is enhanced and the by-products, or less valuable products, such as fuel oil, are minimized.

Furthermore, traditional conversion processes produce heavy gas oils (vacuum gas oils) which, in turn, must be further processed in other plant units in order to be transformed into fuel. They are therefore semifinished products.

We have now found a new catalytic system and a new hydroconversion process which allow both the total conversion of distillation residues without the production of by-products or semifinished products (coke, fuel oil, VGO), at the same time obtaining high conversion rates and therefore lower reaction volumes.

The products obtained are high-quality and in any case have a much lower sulfur and nitrogen content with respect to those obtained with the processes currently used. The distillates obtained, at the most require a low-severity hydrogenation treatment to reach the necessary specifications for being subsequently used for the production of commercial fuels.

In the conversion of the heavy oil fractions, traditional catalysts tend to become deactivated extremely rapidly, thus reducing their performances. In slurry processes, the catalyst does not become deactivated, but the conversion is mainly thermal and requires high temperatures and large reaction volumes. In processes in which the deactivated catalyst is substituted with fresh catalyst, the exhausted catalyst is removed from the process as by-product or waste-product and cannot be regenerated when it has been subjected to a consistent deposition of metals in operation.

In the present invention, the regeneration of a part of the catalytic system in the plant itself, allows a high exchange of catalyst and consequently an average activity of the same that is much higher than that of traditional hydroprocessing units.

The high average activity of the catalyst also allows a better quality of the products and the total conversion of the hydrocarbon fractions having boiling points higher than those of commercial fuels.

The process does not produce coke, fuel oil, DAO, VGO and other possible heavy cuts, characteristic of traditional conversion processes.

The total conversion of the heavy fractions allows fuel to be obtained from distillation residues, using less equipment with respect to traditional operating cycles in refineries, thus allowing a significant reduction in investment and operating costs associated with the production of fuel.

The catalytic system object of the present invention, which can be used for the hydroconversion of heavy oils, is characterized in that it comprises:

a first catalyst having a hydrogenating function, consisting of solid particles of which at least 95% by volume have an equivalent diameter lower than 20 μm, preferably lower than 10 μm, more preferably lower than 5 μm, containing one or more sulfides of metals of group VI and/or VIII B, possibly prepared starting from an oil-soluble precursor of the same.

and a second catalyst with a cracking function, consisting of solid particles of which at least 90% have an equivalent diameter greater than 5 μm and lower than 5 mm, preferably greater than 10 μm and lower than 1 mm, more preferably greater than 20 μm and lower than 0.8 mm, containing an amorphous silico-aluminate and/or a crystalline silico-aluminate and/or an alumina.

the average equivalent diameter of the solid particles of the second catalyst being greater than the average equivalent diameter of the solid particles of the first catalyst, preferably greater than at least 30 μm, more preferably greater than at least 50 μm.

Among the sulfides of the metal of Group VI contained in the first catalyst or forming the first hydrogenation catalyst, those preferred are $MoS_2$ and/or $WS_2$, possibly prepared from an oil-soluble precursor of the same.

In the case of the second cracking catalyst containing crystalline silico-aluminate, the same is preferably selected from MCM-22 zeolite and zeolites having at least one channel system with an average diameter greater than 5 Angstrom (large-pore zeolites), more preferably Beta zeolite and zeolite Y.

The second catalyst can also be a FCC catalyst (Fluid Catalytic Cracking).

The conversion is carried out thanks to the use of the two catalysts which have the task of providing the system with two different catalytic functions, the first with a catalytic hydrogenation function and the second with a catalytic cracking function.

The first catalyst generally forms a slurry system with the liquid in reaction and does not undergo deactivation, whereas the second catalyst shows a more or less gradual deterioration of its cracking activity, depending on the characteristics of the hydrocarbon feedstock and operative conditions of the conversion reactor.

The deactivation is mainly caused by the deposition of organic compounds. The deposition of the metals contained in the feedstock is limited to the presence of the first catalyst. The separation of the two catalytic functions on independent solid particles and with different dimensions (first catalyst and second catalyst) allows their physical separation and therefore independent management in the process.

The combined action of the two catalysts creates a synergy which allows a better result to be obtained with respect to that obtainable using single catalysts.

The process for the hydroconversion of heavy oils, a further object of the present invention, comprises sending heavy oil to a hydrotreating step carried out in one or more reactors in parallel, in slurry phase, using the catalytic system described above, in the presence of hydrogen or a mixture of hydrogen and $H_2S$, obtaining a stream of products in vapour or liquid-vapour phase and extracting from the bottom of the reactor(s), in continuous or batch mode, a liquid stream containing non-converted products together with the catalysts of the catalytic system used, said extracted liquid stream being then separated into a primary clarified stream containing the first catalyst, which is at least partially recycled to the hydroprocessing step, and a stream rich in the second catalyst, the latter being regenerated in a regeneration step and at least partially recycled to the hydroprocessing step.

The primary stream, clarified before being recycled to the hydroprocessing step, can be at least partially separated into a secondary clarified stream containing part of the first catalyst and into a solid stream containing part of the first catalyst, possible metals initially present in the heavy oil fed, and possibly part of the second catalyst, this secondary clarified stream only being at least partially, preferably completely, recycled to the hydroprocessing step.

At least part of the stream rich in the first catalyst, obtained from the separation of the primary clarified stream, can be the purge stream of the first catalyst and metals contained in the hydrocarbon feedstock fed to the reactor.

The stream rich in the second catalyst can be possibly dried before being regenerated in the regeneration step.

Before being dried, the stream rich in the second catalyst can be possibly separated, preferably by the addition of washing solvent, in a liquid stream containing part of the washing solvent and part of the first catalyst, which is recycled to the hydroprocessing step, and a solid/liquid stream containing part of the solvent and the second catalyst, only the latter stream being sent to the drying and/or regeneration step.

With this process, the hydrocarbon products obtained do not require any conversion treatment.

In the process, the catalysts are extracted from the reactor together with a fraction of reaction liquid. The mixture is subjected to separation and washing operations. The first catalyst is recycled to the reactor together with a fraction of the reaction liquid. The separation and washing operations do not alter its hydrogenating catalytic activity. A fraction of the solids contained in this stream recycled to the reactor can be separated by conventional solid-liquid separation techniques and purged, in order to control the solid fraction inside this stream recycled to the reactor. After the separation, washing and drying treatment, the second catalyst, which has a catalytic cracking function, is regenerated by combustion with oxygen (e.g. oxygen present in the air) for restoring a part or all of the catalytic activity. The recycling to the reactor of the second catalyst, possibly with the addition of a portion of fresh second catalyst, allows an active catalytic system to be maintained in the reaction environment. An aliquot of the regenerated catalyst can be purged to control the average activity of the regenerated catalytic stream.

The use of a slurry hydrogenating function allows an important synergy with the cracking catalyst. The hydrogenating function eliminates, or at least considerably reduces, poisons which decrease the activity of the cracking catalyst. In this way, the cracking catalyst shows a higher activity and maintains this for a longer time with respect to a process without the hydrogenating function. The hydrogenation of molecular species having a higher molecular weight (fraction of the hydrocarbon feedstock with a normal boiling point higher than 500° C.) limits the deposition of organic compounds on the catalyst. This also allows the loss in yield (organic compounds or coke eliminated by combustion) to be limited.

The deposition of organic species on the catalyst and their consequent combustion is comparable to a purge of organic compounds. This purge proves to be extremely selective as the molecules which are deposited on and poison the catalyst are heavy molecules, rich in nitrogen. These molecules are difficult to convert and, when converted, give rise to lower-quality products which are difficult to hydrotreat due to the high aromatic nature and nitrogen content.

Some traditional processes use a catalyst for catalytic cracking but not with a hydrogenating function, for example Fluid Catalytic Cracking (FCC). With respect to the catalytic process and system claimed, in this process, the absence of a hydrogenating function, the low pressure (<5 barg) and the high reaction temperature (>500° C.) lead to a rapid deactivation of the catalyst due to the formation of coke and unsaturated products (olefins) and with a high content of aromatic compounds. In particular, the atmospheric gas oil cut (light cycle oil, LCO) is of low-quality for the production of fuels. The products obtained have a high content of sulfur, nitrogen and aromatic compounds with respect to the catalytic process and system claimed. The strong tendency of the feedstock to form coke on the catalyst, the necessity of vaporizing and/or finely subdividing the feedstock, prevents the feeding of pure vacuum residue or in any case a feedstock consisting of a majority fraction of vacuum residue.

Other traditional processes use catalysts with a cracking and hydrogenating function on the same catalytic particle, for example fixed-bed hydrocracking. The catalyst used cannot treat feedstocks containing polynuclear aromatic compounds or nitrogenated compounds in concentrations, for example, over 50 wppm.

These hydrocarbon compounds would lead to a collapse of the catalytic activity in a short time and the necessity of substituting the catalyst. The feeding of this process is typically a hydrotreated vacuum gas oil. With respect to the process and catalytic system claimed, it is consequently not possible to treat heavy feedstocks (atmospheric residue or vacuum residue). When deactivated, the catalyst for hydrocracking must be discharged and substituted with fresh catalyst. This procedure requires shut-down of the plant, discharge of the catalyst, charging of the reactor with fresh catalyst and start-up of the plant.

With the catalytic system and process claimed, the regeneration of the cracking catalyst is possible, together with its immediate use in the conversion reactor without the necessity of shutting-down the plant. Furthermore, the hydrocracking catalyst cannot be regenerated and reused with the process described in the process claimed.

The conversion of heavy fractions such as atmospheric and vacuum residues is also carried out with processes with an ebullated-bed catalyst. The catalytic particles essentially only have a hydrogenating function. The conversion of the feedstock mainly takes place by thermal cracking. With respect to the process claimed, commercial processes of this type produce heavy distillates (vacuum gas oils) and fuel oil. The vacuum distillates must be subsequently converted in other conversion plants. Fuel oil is a product having a lower value with respect to distillates destined for the production of fuels. In the process claimed, vacuum gas oils and fuel oil are not produced but converted in the reactor to products with a higher value. The catalyst undergoes a loss of activity with time and must be substituted by fresh catalyst. The catalyst extracted is not regenerated and cannot therefore be re-used in the process but must be disposed of or returned to the supplier. The quality of the light and medium distillates is lower than that obtained through the process claimed.

The coking of the distillation residues produces an important quantity of coke, absent as a product in the process claimed, and the distillates produced are extremely aromatic and contain a high content of sulfur, aromatic compounds and nitrogen with respect to the process claimed. The yield to distillates of coking is lower than that obtained using the process claimed.

The process claimed transforms a hydrocarbon feedstock having a low commercial value into more valuable products.

The hydrocarbon feedstock can consist of atmospheric or vacuum oil distillation residue (conventional or non-conventional), vacuum gas oil (VGO) produced by the distillation of oil or products coming from conversion processes of oil or its fractions, deasphalted oil coming from solvent deasphalting units, atmospheric or vacuum distillation residues coming from conversion processes of oil or its fractions.

The products consist of hydrocarbons with a normal boiling point lower than 380° C., in addition to by-products mainly consisting of hydrogen sulfide, ammonia and water vapour.

The transformation of the feedstock into products takes place in one or more reactors (preferably identical) in parallel by means of cracking and hydrogenation reactions carried out in the same reaction volume thanks to the presence of two catalysts (first and second catalyst) forming a dual catalytic system (dual catalyst) at temperatures ranging from 360 to 480° C. and a total pressure ranging from 80 barg to 200 barg.

The improvements in the process with a dual-catalyst catalytic system, with respect to the use of single catalyst, are mainly appreciated on all or at least some of the following parameters: productivity (feedstock transformed in the time unit, given a reactor volume), selectivity in products (weight fraction of product with respect to the total of products), sulfur and nitrogen content of the distilled products, stability of the second catalyst in terms of deposition of metals and carbonaceous compounds, molecular characteristics of the distillates and LPG products.

The catalytic system used and the original process scheme allow results to be obtained, in terms of the above-mentioned parameters, which would not be possible using only one of the catalysts or with a different process scheme.

The hydrogenation catalyst preferably contains one or more metal sulfide. The preferred metals are Mo, W and Fe, considered either individually or in a mixture. In the case of Mo, the hydrogenating function consists of $MoS_2$ arranged in stacked lamellae, having nanometric dimensions, with less than 6, and normally less than 4, stacked lamellae. The average equivalent diameter of the $MoS_2$ lamellae is lower than 100 Å, usually lower than 60 Å.

The concentration of the metal used, referring only to the liquid fraction in the reactor, is preferably lower than 100 moles Me/metric ton of liquid, more preferably lower than 60 moles/metric ton of liquid, even more preferably lower than 50 moles/metric ton of liquid.

The concentration of the second catalyst in the mixture contained in the reactor is preferably lower than 50 wt %, more preferably lower than 45 wt %, even more preferably lower than 40 wt %.

The hydroprocessing step is preferably carried out at a temperature ranging from 360 to 480° C. and at a pressure ranging from 80 to 200 atmospheres.

The ratio between the second catalyst and the heavy oil (cat/oil) fed to the hydroprocessing step, preferably ranges from 1 to 2000 kg/metric tons of feedstock, more preferably from 5 to 1000 kg/metric tons of feedstock, even more preferably from 50 to 700 kg/metric tons of feedstock.

Figure 1:
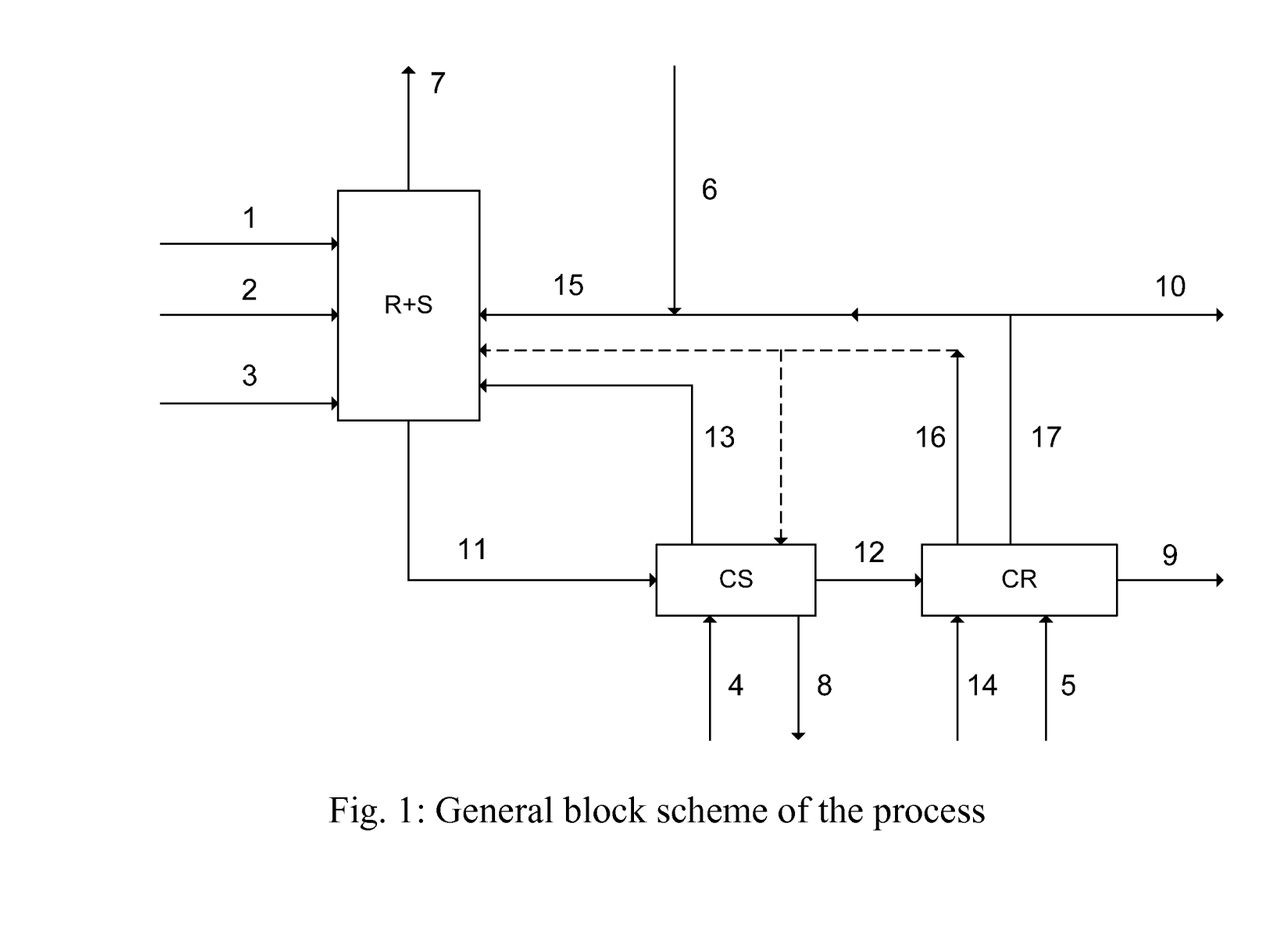
FIG. 1 shows a block scheme of the process.
Figure 2:
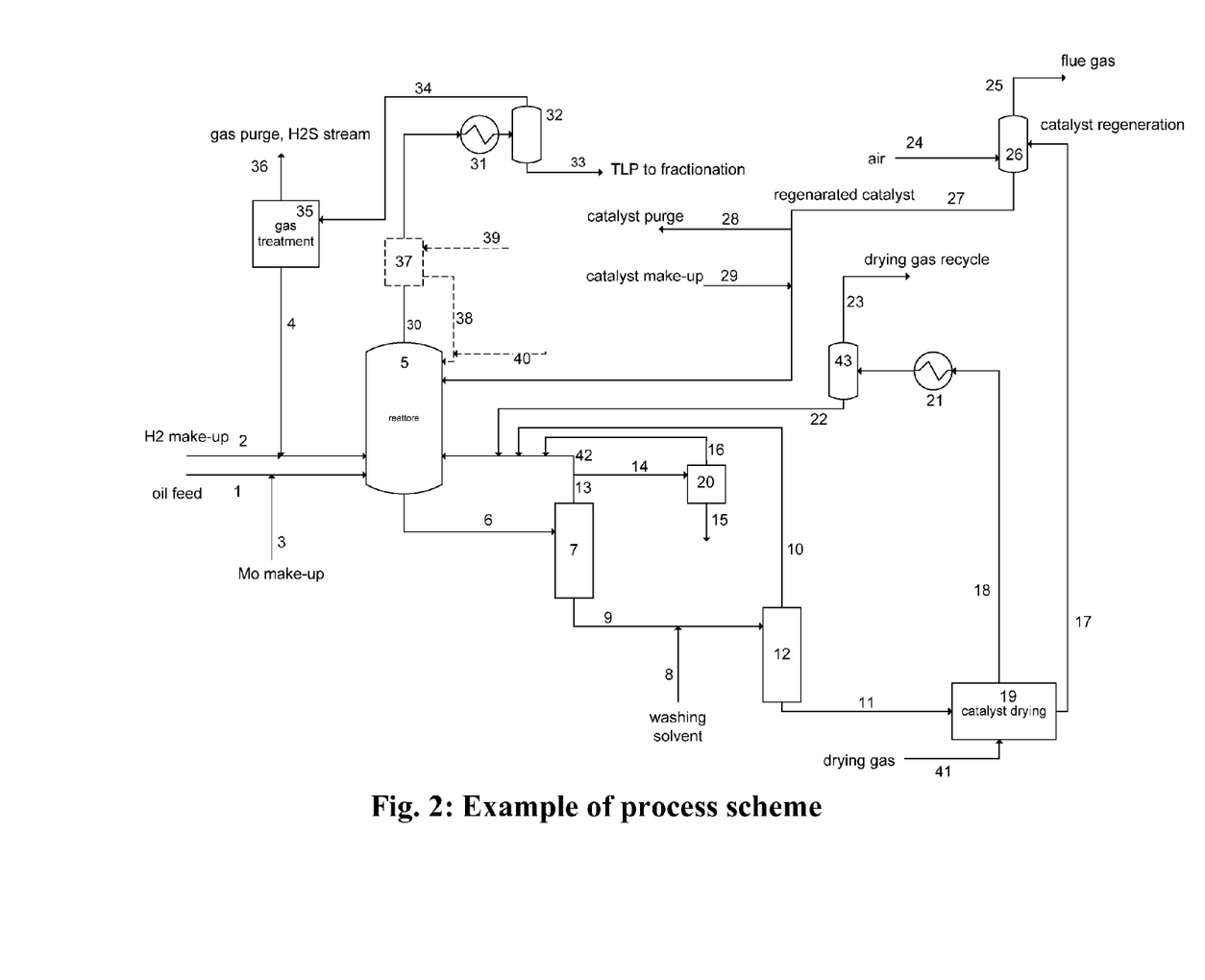
FIG. 2 shows an example of a process scheme, more detailed with respect to FIG. 1.

A preferred embodiment of the present invention is now provided, with the help of FIGS. 1 and 2, which should not be considered as limiting the scope of the invention.

The process scheme in FIG. 1 consists of three main sections: a reaction and separation section of the reaction products, a separation section of the solid catalysts and a regeneration section of the second catalyst.

The reaction section (R+S) consists of one or more reactors, all the same, with a parallel configuration if more than one reactor is present, and equipment, process lines and connections between the same which allow the extraction from the reactor(s) and separation of the products (7) from possible liquid or gaseous streams recycled inside the sections, and the extraction from the reactor of a stream containing the two catalysts and the liquid contained in the reactor (11). The extraction of the stream 11 from the reactor can be made in continuous or batch mode.

The following streams are fed in continuous to the reaction section (R+S): the hydrocarbon feedstock (1), a gaseous stream rich in hydrogen (2), the first catalyst (3) or a precursor of the same soluble in the feedstock or in the liquid present in the reactor. All or only some of the different streams can be fed directly to the reactor(s), either totally or only a fraction thereof, mixed before being fed to the reactor(s).

The first catalyst is a solid hydrogenation catalyst dispersed in the reaction medium. The first catalyst forms a slurry system together with the liquid present in the reaction environment.

A stream (15) consisting of the second regenerated catalyst and second fresh catalyst (6), is added to the reaction section. The addition can be made in continuous or batch mode.

The ratio between the stream of catalyst 15 and the hydrocarbon feedstock (cat/oil) can be varied to modulate the effects of catalytic cracking on the overall results of the reaction. It is possible, for example but not exclusively, to vary the productivity, selectivity to products, the characteristics of the distillates and LPG products and residual sulfur and nitrogen content of the liquid products. The products (7) leaving the reaction and separation section, represented, for the sake of simplicity, by a single stream in the scheme, are composed of at least a gaseous stream rich in hydrogen and containing hydrocarbon gases which can be possibly sent to a hydrogen recovery unit, one or more hydrocarbon streams consisting of hydrocarbons liquid under normal conditions and a stream of by-products mainly consisting of hydrogen sulfide, ammonia, water.

Considering only the liquid stream under normal conditions, or the sum of liquid streams under normal conditions, which forms part of the overall stream of products (7) indicated in the scheme, at least 90% by volume is composed of hydrocarbons with a boiling point lower than 380° C.

The stream (11) can be extracted from the reactor in continuous or batch mode. Said stream is sent to the separation section of the solid catalysts (CS). In this section (CS), the second catalyst is separated, obtaining a primary clarified stream and a stream rich in the second catalyst using a suitable technique, or combination of techniques, selected from conventional techniques (sedimentation, filtration, centrifugation, etc.).

The primary clarified stream can be at least partly recycled to the reactor (13), without further separation treatment.

Either all or part of the primary clarified stream can be possibly further separated into a stream containing all or part of the first catalyst (stream rich in the first catalyst) and a secondary clarified stream to be fed to the reactor by means of a second separation treatment, applying conventional techniques or combinations of these (sedimentation, filtration, centrifugation, etc.). In the case of further separation treatment of the primary clarified stream or a part of this, the stream rich in the first catalyst forms the purge stream of the first catalyst (8) and metal contained in the hydrocarbon feedstock fed to the reactor.

The separation operations can be made by mixing to the process streams a suitable solvent (4). The solvent, if used, has the function of improving the separation of the catalysts in the first and/or second separation. The solvent can be a pure organic compound, for example a pure hydrocarbon, or a mixture of suitable organic compounds, for example hydrocarbons. It can also be a stream produced by the process itself or a fraction of the overall stream of products (7). A recovery of the solvent can be carried out in the separation section to generate an internal recycling which limits the consumption of solvent (4). In this case, the stream 4 is a solvent make-up.

In the regeneration section (CR), the stream (12) rich in the second catalyst can be possibly dried, by means of conventional techniques, with a suitable process fluid (14) possibly withdrawn from equipment within the process, before being sent to regeneration. A liquid stream (16) is obtained from the possible drying, which can be sent to the reaction and separation section (R+S) or to the separation section of the catalysts (CS).

In the regeneration section, the second catalyst is regenerated by combustion of the organic compounds deposited on its surface (outer surface of the particles and inner surface of the pores) during the reaction. The combustion is carried out in a regeneration reactor by mixing air (5), possibly heated, with the second catalyst. The combustion eliminates the organic compounds deposited on the second catalyst and produces a gaseous stream (9) mainly composed of CO, $CO_2$, $H_2$, $H_2O$, $N_2$, $SO_2$, $SO_3$, $NO_2$, NO with the possible entrainment of catalytic solid fines. This stream (9) is treated according to traditional abatement processes of poisons/pollutants common to treatment processes of gaseous effluents from the combustion of organic compounds in general and in particular deposited on solid catalysts.

The regenerated catalyst (17) either partly or totally reacquires its initial activity. An aliquot of the regenerated catalyst can be eliminated (10) to allow the addition of fresh catalyst (6) (catalyst that has not yet been used and regenerated). The ratio of fresh second catalyst/regenerated second catalyst is determined in relation to the activity of the regenerated second catalyst, with respect to the fresh second catalyst, and in relation to the activity to be obtained in the reactor(s) for the conversion of the feedstock.

FIG. 2 indicates an example of a process scheme which illustrates the invention, object of the patent application in question, in greater detail with respect to what is illustrated in FIG. 1.

The feedstock (1) is fed to the reactor (5). A make-up of an oil-soluble precursor of a slurry hydrogenation catalyst, for example an oil-soluble compound of Mo, and/or W, and/or Fe and/or another metal capable of forming a slurry hydrogenation catalyst in a reaction environment, is added to the hydrocarbon stream fed.

A vapour stream (30) leaves the head of the reactor, and passes into the apparatus, or combination of apparatuses (37), and is subsequently cooled in a heat exchanger system (31).

The liquid phase produced (TLP), which represents the total liquid product (33), is separated from the gas phase (34) in one or more gas/liquid separators (32). The apparatus, or combination of apparatuses, (37), is optional, it possibly has the function of controlling the final boiling point of the liquid hydrocarbons produced in the reaction section. This can be obtained for example by washing the vapour stream (30) with a suitable hydrocarbon stream. The fraction of the stream (30) with the highest boiling point is recycled to the reactor together with the washing hydrocarbon stream. If the equipment (37) is not implemented, the control of the final boiling point of the liquid stream produced (33) could be achieved with conventional equipment for the fractionation of hydrocarbon streams. The hydrocarbon fraction with boiling points higher than those desired are then recycled to the reactor (40).

The gaseous stream is treated in a section of the plant (35) suitable for removing the hydrogen sulfide and purging an aliquot of gas (36) to keep the percentage of incondensable hydrocarbons constant in the reaction gas. After being mixed with a stream of make-up $H_2$ (2), the stream of recycled gas (4) is heated to the desired temperature in an apparatus not illustrated in the drawing before entering the reactor.

A slurry stream (6) containing the first catalyst and second catalyst is extracted from the reactor.

Said current is separated in the separator (7) into a primary clarified stream (13) containing the first catalyst and a stream rich in the second catalyst (9).

The primary clarified stream (13) can be completely recycled (42) to the hydroprocessing reactor (5) or a part of it (14) sent to a further separator (20) in which a secondary clarified stream is separated and recycled (16) to the hydroprocessing reactor (5) and a substantially solid purge stream (15) containing part of the first catalyst and possibly metals contained in the feedstock and possibly part of the second catalyst.

A washing solvent (8) is added to the stream rich in the second catalyst (9) before being sent to an additional solid-liquid separator (12) from which a liquid stream (10) containing the reaction liquid is separated together with a part of the first catalyst and part of the washing solvent which is recycled to the reactor (5) and a solid-liquid stream (11) containing the second catalyst and part of the washing liquid which is dried (19) by means of the drying gas (41).

A stream (17) containing the dried catalyst leaves (19), which is sent to the regenerator (26), in which the catalyst is regenerated with air (24). The regenerated catalyst (27) is recycled, together with the make-up catalyst (29), to the reactor (5) except for a purge (28). A stream of exhausted gas is produced from the regeneration of the catalyst (25).

A stream (18) containing the drying gas and part of the washing solvent also leaves (19), which is cooled in the exchanger (21) and separated in the separator (43) obtaining the drying gas (23) to be recycled to the drying step after heating and a stream containing part of the washing solvent (22) which is recycled to the reactor.

EXAMPLE 1: COMPARATIVE TESTS IN A MICROREACTOR

This example shows how the combined use of two catalysts creates a synergy which allows higher performances than ones obtained with single separate catalysts.

The data provided in Table 1 refer to experimental tests carried out in a plant with a reactor having a total volume of 30 cm$^3$ (slurry volume in reaction 15 cm$^3$). The catalytic system was added at the beginning of the test and was maintained in the reactor until the end of the test. The hydrocarbon feedstock was fed in continuous to the reactor by liquid level control. A gaseous stream mainly consisting of hydrogen and incondensable light hydrocarbons, obtained by joining a stream of recycled gas and a stream of make-up $H_2$, was sent in continuous to the reactor together with the feedstock. The concentration of $H_2$ in the overall gaseous stream was higher than 97% vol. The flow-rate of the overall gaseous stream to the reactor was 44 Nl/h. The products present in vapour phase were extracted from the head of the reactor. The vapour stream leaving the reactor was cooled and the condensed liquids were collected in a vessel. The tests were carried out at 430° C. and at a partial hydrogen pressure of 125 bar.

Table 1 indicates the characteristics of the feedstock used.

TABLE 1 characteristics of the feedstock used

| S | wt % | 2.56 |
|---|---|---|
| N | wt % | 0.58 |
| C | wt % | 86.0 |
| H | wt % | 11.4 |
| IBP | ° C. | 246 |
| 10% | ° C. | 359 |
| 30% | ° C. | 452 |
| 50% | ° C. | 536 |
| 70% | ° C. | 620 |
| 80% | ° C. | 676 |
| Asphaltenes (nC5) | wt % | 10.8 |
| Ni | wppm | 32 |
| V | wppm | 89 |

Table 2 indicates the results of the tests carried out with three different catalytic systems: the first catalyst alone, the second catalyst alone and the system comprising the two catalysts.

The compositions, dimensions and quantity of the two catalysts are as follows:

First catalyst (Cat-1): molybdenite ($MoS_2$), obtained from an oil-soluble precursor (Mo-octoate) premixed with fresh feedstock, by heating the mixture to the reaction temperature in the presence of hydrogen. The catalyst is in the form of nanodispersed lamellae. The lamellae are single or stacked with an average stacking degree of less than 4 and have an average equivalent diameter lower than 60 Å.

The molybdenite is dispersed in the reaction liquid. A fraction or all of the molybdenite can interact with organic solid particles and is deposited on the surface of these. In addition to the dispersed molybdenite, the organic-based solid particles with molybdenite deposited, also participate in the hydrogenating action. Over 95% by volume of the slurry hydrogenation catalyst consists of solid particles with an equivalent diameter lower than 20 μm. In the tests indicated in Table 2 carried out in the presence of Cat-1, the quantity of Cat-1 used was obtained with the addition of a quantity of oil-soluble precursor corresponding to 45 μg of Mo.

Second catalyst (Cat-2) (weight percentages): 22.8% Si, 25.0% Al, 2.3% La, 0.5% Ti, 0.3% Fe, 0.2% Na, the complement to 100% consisting of O.

Over 90% by volume of the second catalyst consists of solid particles with an equivalent diameter higher than 20 μm. In the tests indicated in Table 2 carried out in the presence of Cat-2, the quantity of Cat-2 used was equal to 5.5 g.

TABLE 2 comparative data with different catalytic systems

| | | Cat-1 | Cat-2 | Cat-1 + Cat-2 |
|---|---|---|---|---|
| Productivity (flow-rate feedstock/m$^3$ reactor) | kg/h m$^3$ | 130 | 220 | 220 |
| Residual S in the total liquid product | wppm | 3400 | 9700 | 2100 |
| Residual N in the total liquid product | wppm | 2244 | 382 | 136 |
| Fuel Gas | wt % | 2.5 | 3.0 | 2.4 |
| GPL | wt % | 5.4 | 6.1 | 8.9 |
| Light distillates, C5-170° C. | wt % | 11.7 | 18.7 | 19.9 |
| Medium distillates, 170° C.-370° C. | wt % | 57.1 | 56.4 | 54.3 |
| Heavy distillates, 370-430° C. | wt % | 22.8 | 10.1 | 13.0 |
| coke/insoluble hydrocarbons | wt % | 0.40 | 5.78 | 1.47 |

The data indicated in Table 2 refer to tests having a duration of 12 hours.

In the example described, it can be observed how the system of the two catalysts allows better results to be obtained with respect to the single systems of separate catalysts as far as the quality of the products is concerned (lower S and N content in the total liquid produced).

Cat-2 alone improves the productivity with respect to Cat-1 alone but increases the formation of coke and/or insoluble organic compounds coke-like. The addition of the hydrogenation catalyst (Cat-1) to Cat-2, not only guarantees a higher quality of the products in terms of residual sulfur and nitrogen, but also reduces the formation of carbonaceous compounds on the cracking catalyst (Cat-2). This allows high catalytic performances of the system to be maintained for a longer period of time.

The separability of the two catalysts, the regeneration of the cracking catalyst and its recycling to the reactor, allow the hydrocracking of heavy feedstocks such as distillation residues, directly to distillates.

EXAMPLE 2: CONTINUOUS TEST IN A PILOT PLANT: PERFORMANCES AND QUALITY OF THE PRODUCTS

The process claimed was also tested on a higher volume reactor. A pilot plant was constructed with a reactor having a total volume of 500 cm$^3$. The reactor can operate with a slurry volume of 300 cm$^3$. The pilot plant also allows the addition and extraction of the second catalyst (Cat-2) from the reactor consequently obtaining data representative of the process scheme claimed.

Table 3 indicates the results of a representative test of a set of operative conditions of the process claimed. The data indicated in the present example were obtained at 430° C. and 125 bar of partial hydrogen pressure. During the test, a stream of H$_2$ having a purity higher than 99% vol. was fed to the reactor at a flow-rate of 50 Nl/h.

The characteristics of the hydrocarbon feedstock fed to the reactor are described in Table 1.

TABLE 3

| Continuous test data in a pilot plant | | |
|---|---|---|
| Cat-2/oil | g/g | 0.10 |
| Cat-2 in the slurry in reaction | wt % | 35% |
| Mo in the slurry in reaction | wppm | 4000 |
| Productivity (feedstock(flow-rate/ reaction volume) | kg/h m3 | 136.1 |
| Selectivity to products | | |
| H$_2$S | wt/wt % | 2.5 |
| Fuel Gas | wt/wt % | 3.6 |
| GPL | wt/wt % | 15.1 |
| Light distillates (C5-170° C.) | wt/wt % | 27.6 |
| Medium distillates (170-380° C.) | wt/wt % | 48.7 |
| Purge/loss in yield | wt/wt % | 2.5 |
| S in TLP | wppm | 1550 |
| N in TLP | Wppm | 110 |
| Overall HDS | % | 93.7% |
| Overall HDN | % | 97.5% |

In Table 3, it can be observed how the desulfuration and denitrogenation degree are both high. The total liquid obtained (TLP) only contains a few ppm of nitrogen and a very low sulfur fraction. In order to obtain products that respect the specifications relating to the sulfur content, a hydrofinishing treatment which requires a low severity is sufficient.

The results indicated in the example derive from one of the possible configurations (set of operating conditions) the process can have.

The test was set up for converting the feedstock to medium and light distillates. The data refer to steady-state operative conditions of the pilot plant. The experimental test lasted 500 hours. The distribution of the products and productivity can be easily controlled by acting on the operative conditions (cat-2/oil, flow-rate of the gas recycled to the reactor, temperature, total pressure, percentage of catalyst in the slurry present in the reactor, etc.).

FIG. 1 General block scheme of the process

FIG. 2 Example of process scheme

The invention claimed is:

1. A catalytic system which can be used for the hydroconversion of heavy oils comprising a mixture of:
    a first catalyst, having a hydrogenating function, consisting of solid particles of which at least 95% by volume having an equivalent diameter smaller than 20 μm, containing one or more sulfides of metals of group VI and/or VIII B; and
    a second catalyst, having a cracking function, consisting of solid particles of which at least 90% by volume having an equivalent diameter larger than 5 μm and smaller than 5 mm, containing an amorphous silico-aluminate and/or a crystalline silico-aluminate and/or an alumina, wherein
    the equivalent average diameter of the solid particles of the second catalyst is greater than the equivalent average diameter of the solid particles of the first catalyst.

2. The catalytic system according to claim 1, wherein the first catalyst consists of MoS$_2$ and/or WS$_2$ and/or FeS$_x$.

3. The catalytic system according to claim 1, wherein the first catalyst is obtained from an oil-soluble precursor of metals of group VI and/or VIII B.

4. The catalytic system according to claim 1, wherein the crystalline silico-aluminate is selected from zeolites having at least one system of channels with an average diameter higher than 5 Angstroms (large-pore zeolites).

5. The catalytic system according to claim 1, wherein the crystalline silico-aluminate is as MCM-22 zeolite.

6. The catalytic system according to claim 1, wherein at least 90% by volume of the solid particles forming the second catalyst have a diameter larger than 10 μm and smaller than 1 mm.

7. The catalytic system according to claim 1, wherein at least 90% by volume of the solid particles forming the second catalyst have a diameter larger than 20 μm and smaller than 0.8 mm.

8. The catalytic system according to claim 1, wherein at least 95% by volume of the solid particles forming the second catalyst have a diameter smaller than 5 μm.

9. The catalytic system according to claim 1, wherein the equivalent average diameter of the solid particles of the second catalyst is at least 30 μm greater than the equivalent average diameter of the solid particles of the first catalyst.

10. The catalytic system according to claim 1, wherein the equivalent average diameter of the solid particles of the second catalyst is at least 50 μm greater than the equivalent average diameter of the solid particles of the first catalyst.

11. The catalytic system according to claim 1, wherein the second catalyst is a catalyst for FCC (Fluid Catalytic Cracking).

12. A process for the hydroconversion of heavy oils comprising: feeding the heavy oil to a hydroprocessing step carried out in one or more slurry reactors, using a catalytic system according to claim 1, in the presence of hydrogen or a mixture of hydrogen and H$_2$S, so obtaining a stream of products in vapour or liquid-vapour phase, and extracting from the bottom of the reactor(s), in continuous or discontinuous, a liquid stream containing non-converted products together with the two catalysts of the catalytic system used, said extracted liquid stream then being separated into a clarified primary stream containing the first catalyst, which is at least partially recycled to the hydroprocessing step, and a stream rich in the second catalyst, which is regenerated in a regeneration step and at least partially recycled to the hydroprocessing step.

13. The process according to claim 12, wherein, before being recycled to the hydroprocessing step, the clarified primary stream is at least partially separated into a clarified secondary stream and a solid stream containing part of the first catalyst, optionally metals present in the heavy oil feed and optionally part of the second catalyst, only said clarified secondary stream being at least partially recycled to the hydroprocessing step.

14. The process according to claim 12, wherein, before being dried, the stream rich in the second catalyst is separated, by addition of a washing solvent, into a liquid stream containing part of the washing solvent and part of the first catalyst, which is recycled to the hydroprocessing step, and into a solid-liquid stream containing part of the solvent and the second catalyst, only said last stream being sent to the regeneration step.

15. The process according to claim 12, wherein the stream rich in the second catalyst is dried before being regenerated in the regeneration step.

16. The process according to claim 12, wherein the hydroprocessing step is carried out at a temperature ranging from 360 to 480° C. and a pressure ranging from 80 to 200 atmospheres.

17. The process according to claim 12, wherein the ratio between the second catalyst and the heavy oil fed to the hydroprocessing step ranges from 1 to 2,000 kg/metric ton.

* * * * *